United States Patent Office 3,456,813
Patented July 22, 1969

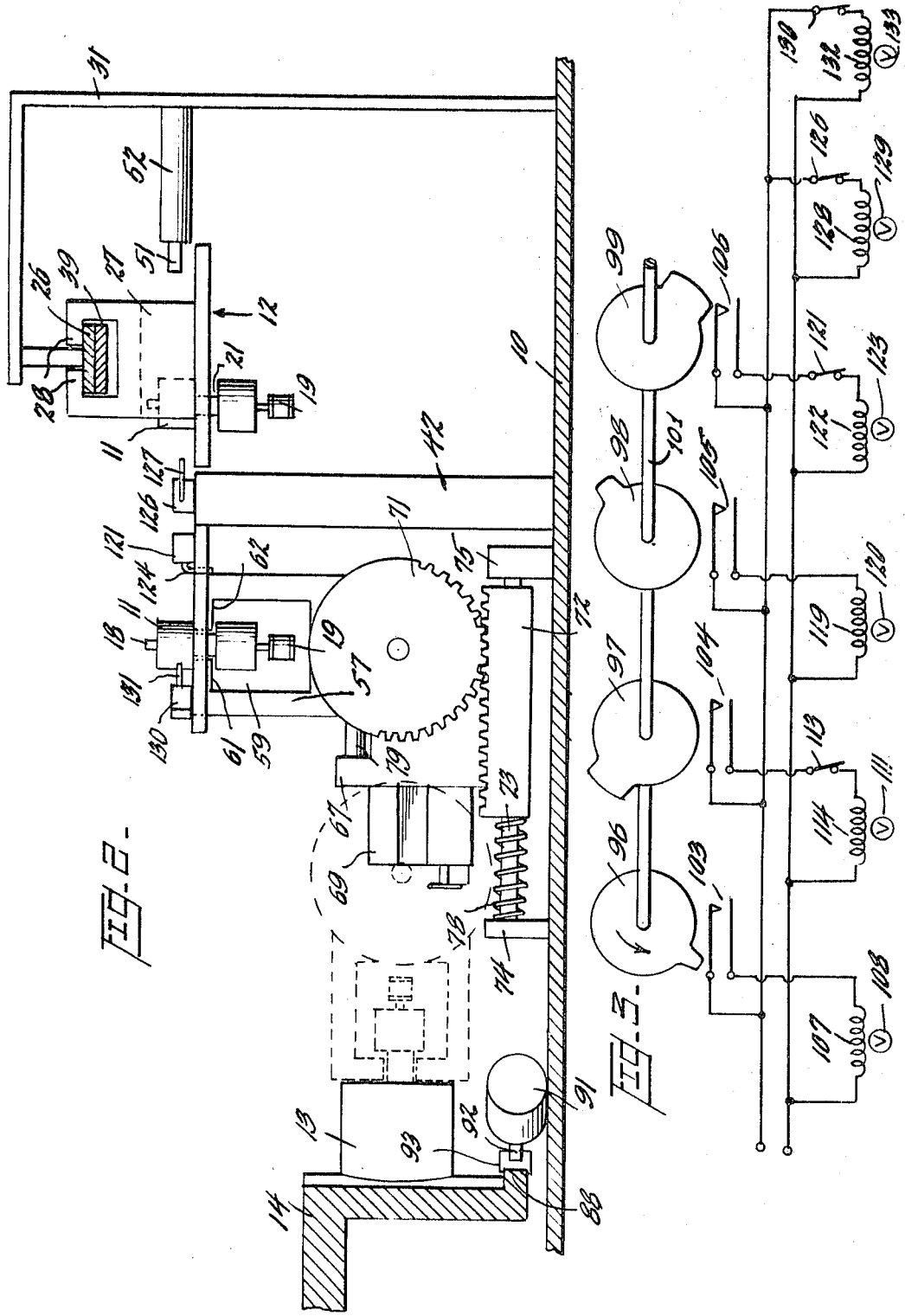

3,456,813
APPARATUS FOR TRANSFERRING ARTICLES
William G. Grainger and Richard C. Sanders, Winston-Salem, N.C., assignors to Western Electric Company, Incorporated, New York, N.Y., a corporation of New York
Filed Apr. 25, 1966, Ser. No. 545,097
Int. Cl. B25j 3/00
U.S. Cl. 214—1                                    10 Claims

ABSTRACT OF THE DISCLOSURE

An article is unloaded from a first magazine and advanced along a first passageway to a transfer station at which a transfer arm is located. The transfer arm moves the article to an endless conveyor which advances the articles through a work station. The article is then returned to the transfer arm which moves back to the transfer station. Finally, the article is advanced from the transfer station along a second passageway and is loaded into a second magazine.

---

This invention relates to apparatus for transferring articles and more particularly to an apparatus for transferring articles both to and from a conveyor or work station.

In the manufacture of tantalum capacitors, anodized sintered tantalum pellets are fed from a supply station to an endless conveyor which sequentially advances the pellets to manganese nitrate coating and heating stations to pyrolyze the pellet. After pyrolyzing, the pellets are removed from the conveyor and moved to another station for subsequent processing.

An object of the present invention is a new and improved apparatus for transferring such articles.

Another object of the invention is an apparatus utilizing a single transfer arm for transferring articles both to and from a work station.

A further object of the invention is an apparatus for transferring an article with a motion incorporating both rotational and linear components.

A still further object of the invention is to unload unprocessed anodes from a magazine and to load processed anodes into the same magazine.

In accordance with these and other objects, an embodiment of the invention has a transfer arm which moves alternately from a supply station to a work station. At the supply station, an unprocessed article is received by the transfer arm from the supply station and a processed article is moved from the arm to the subsequent station.

Another feature of the invention is a transfer arm which both rotates through a predetermined angle and moves linearly for a predetermined distance to transfer an article to a work station.

A further feature of the invention resides in a supply magazine being movable along a path first to an article supply station and then to an article loading station. Unprocessed articles are unloaded at the supply station and then processed articles are loaded into the magazine at the loading station.

A complete understanding of this invention may be had by reference to the following detailed description when considered in conjunction with the accompanying drawings, wherein:

FIG. 2 is a side view of the apparatus shown in FIG. 1 illustrating in dashed lines the movement of the transfer arm to a second position; and FIG. 3 is a schematic showing the control circuit for the apparatus of FIGS. 1 and 2.

Figure 1:
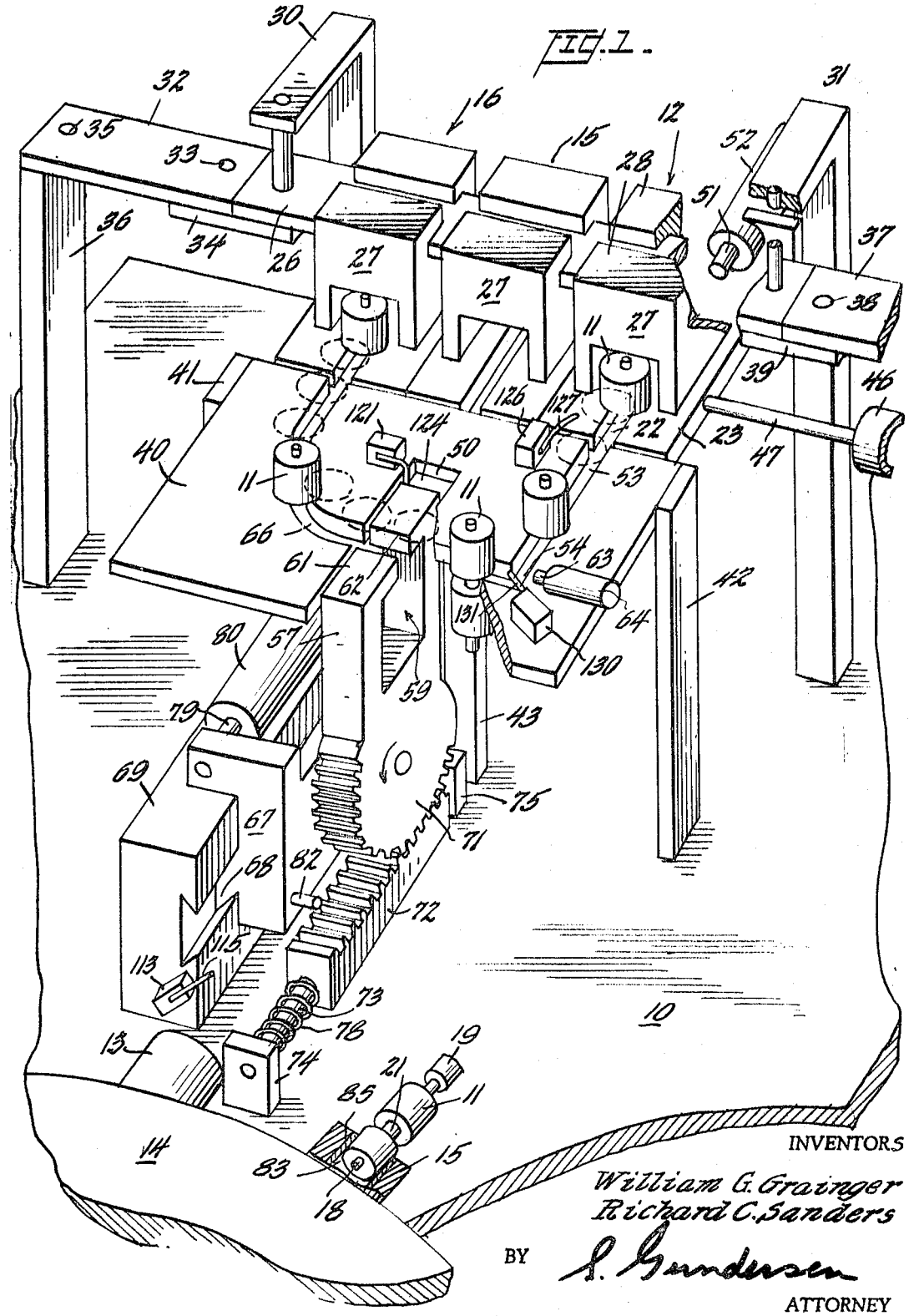
FIG. 1 is a perspective view with cutout sections showing an apparatus embodying the invention.

Referring first to FIGS. 1 and 2, a table 10 supports an apparatus for transferring a cylindrical carrier 11 from a first station or magazine 12 to a holder 13 on a conveyor 14; and for transferring another carrier 11 back from a second holder 15 on the conveyor 14 to a second station or magazine 16. Each of the carriers 11 has a central bore through which a lead 18 from a sintered tantalum pellet 19 extends. The lead 18 is crimped at its upper extremity to hold it within the bore of the carrier 11.

Each of the carriers 11 has an annular groove 21 for holding the carriers 11 within a slot or passageway 22 in a horizontal plate 23 of magazines 12, 15, and 16. The walls of the passageway 22 extend into the grooves 21 to support the carriers 11.

The magazines 12, 15, and 16 each have a bracket 27 mounted on the plate 23 for slidably supporting the magazines 12, 15, and 16 on a bar 26. The bar 26 is supported by brackets 30 and 31 mounted upon the table 10. An additional bar section 32 is removably connected at one end to the bar 26 by a pin 33 extending upward from an underlying extension 34 of the bar 26. The other end of the bar section 32 is mounted on a pin 35 on a support 36 fixed to the table 10. The bar section 32 may be lifted from the pins 33 and 35 for removing the magazine 16 when it is filled with carriers 11. Similarly, a bar section 37 is connected at one end by a pin 38 extending upward from an underlying extension 39 of the bar 26. The other end of the bar section is mounted on support (not shown) similar to the support 36. The bar section 36 may be lifted to load additional magazines in the apparatus. An air cylinder 46 having a piston rod 47 is operative to advance the magazines 12, 15, and 16 sequentially along the bar 26 to move the magazine 12 to an unloading position and the magazine 16 to a loading position.

Adjacent to the magazines 12, 15, and 16, a plate 40 is mounted upon brackets 41, 42, and 43 extending upward from the table 10. The plate 40 has a first passageway 53 leading from the magazine 12 at the magazine unloading position. A piston 51 extending from an air cylinder 52 is effective to push the carriers 11 from the magazine 12 into the first passageway 53 in the plate 40 and to a corner 54 of the passageway 53.

A transfer arm 57 extends into a recess 50 in the plate 40. The transfer arm 57 is bifurcated having opposing fingers 61, 62 forming a transverse slot 59 for receiving a single carrier 11. The fingers 61 and 62 extend into the grooves 21 of the carriers 11. A piston 63 extending from an air cylinder 64 is operative to push a carrier 11 from the corner 54 of the passageway 53 into one end of the slot 59 of the transfer arm 57.

A second passageway 66 within the plate 40 leads from the other end of the slot 59 to the magazine 16 at the magazine loading position. Thus, when the piston 63 pushes a carrier 11 into the slot 59, a carrier already within the slot 59 is pushed into the passageway 66.

The transfer arm 57 is pivotally mounted upon a slidable block 67. The slidable block 67 has a dove-tail 68 which is slidable within a groove in guide 69 mounted upon the table 10. The transfer arm 57 has a section of a pinion 71 formed about its pivot which meshes with a slidable rack 72. The slidable rack 72 is slidably mounted upon a rod 73 which is supported by brackets 74 and 75 mounted upon the table 10. A spring 78 helically wound upon the rod 73 is interposed between one end of the rack 72 and the bracket 74 for biasing the rack 72 against bracket 75.

A piston 79 projecting from an air cylinder 80 advances the slidable block 67 with respect to the guide 69. Upon advancement of the slidable block 67, the pinion section 71 rolls upon the rack 72 to pivot the arm 57 with respect to the block 67. A pin 82 extends from the slidable block 67 into the path of the arm 57 to stop the pivotal movement of the arm 57. Continued movement of the slidable block 67 after the pivotal movement of the arm 57 has been stopped by the pin 82 causes the rack 72 to slide on the rod 73 along with the block 67. Thus, the carrier 11 is inserted into the holder 13 on the conveyor 14. The holders 13 and 15 each have a recess 83 with a resilient sleeve 85 which holes the carrier 11.

The conveyor 14 which is rotatably mounted on the table 10 has ratchet teeth 88 on its periphery (see FIG. 2). An air cylinder 91 mounted on the table 10 has a projectable piston rod 92 with a pawl 93 meshing with the ratchet teeth 88 for indexing the conveyor 14. Operation of the air cylinder 91 and the piston 92 is effective to index the conveyor 14 and advance its holders sequentially to manganese nitrate spraying and infrared heating stations (not shown) to pyrolyze the tantalum pellets. Upon indexing of the carrier 14, the carrier 11 inserted into the holder 13 is removed from the slot 59 and another carrier 11 held within the next succeeding holder 15 is moved into the slot 59. Now, retraction of the air piston 79 pulls the carrier 11 from the holder 15 and pivots the arm 57 back to its initial position.

Control circuit and operation

Referring now to FIG. 3, cams 96, 97, 98, and 99 mounted on a shaft 101 are rotated by a motor (not shown) to operate respective contacts 103, 104, 105, and 106 to control the sequence of operation of the apparatus. First, the rotating cam 96 closes the contacts 103 to complete a circuit through a solenoid winding 107 which operates a valve 108 connected to the air cylinder 64. The piston 63 advances to push a carrier 11 holding an unprocessed anode from the corner 54 of the passageway 53 into the slot 59 of the arm 57 and a carrier 11 holding a processed anode from the slot 59 into the passageway 66. The piston 63 is spring biased to retract after the air cylinder 64 is deactuated by the opening of the contacts 103. Next, the contacts 104 are closed by the cam 97 to complete a circuit through a normally closed switch 113 and a solenoid winding 114 to operate a valve 111 connected to a forward actuating air line of the air cylinder 80. The switch 113 is mounted on the standard 69 and an arm 115 of the switch 113 extends into the path of the slidable block 67. Actution of the air cylinder 80 advances the piston 79 to slide the block 67. The pinion 71 rolls on the rack 72 to first pivot the arm 57 with respect to the block 67 until the arm 57 abuts the pin 82. Then, the arm 57 and the rack 72 advance linearly to insert the carrier 11 into the holder 13. The advancement of the piston 79 is stopped when the block 67 strikes the arm 115 of the switch 113 to open the circuit.

Then, the contacts 105 are closed by the cam 98 to complete a circuit through a solenoid winding 119 to operate a valve 120 connected to the air cylinder 91 (FIG. 2). Operation of the valve 120 advances the spring-loaded piston 92 to index the conveyor 14 and advance the conveyor holders 13 and 15 to succeeding positions. Thus, the carrier 11 just inserted into the holder 13 is removed from the slot 59 and a carrier in the holder 15 is inserted into the slot 59.

Finally, the contacts 106 are closed by the cam 99 to complete a circuit through a normally closed switch 121 and a solenoid winding 122 to operate a valve 123 connected to a reverse actuating air line of the air cylinder 80 to retract the piston 79. The transfer arm 57 retracts linearly to pull the carrier 11 from the holder 15 and then moves cycloidally backward into the recess 50. The switch 121 is mounted on the plate 40 and has an arm 124 extending into the recess 50. When the transfer arm 57 reaches a vertical position within the recess 50 between the passageways 53 and 56, it strikes the arm 124 which opens switch 121 to stop the retraction of the piston 79. Thus, the carrier 11 is pulled from the holder 15 and placed between the passageways 53 and 66. The carrier in the slot 59 just removed from the holder 15 is pushed into the passageway 66 by a succeeding operation of the pistons 63 and the cylinder 64. In following cycles of operation, the carrier 11 in passageway 66 is pushed into the magazine 16.

A switch 126 mounted on the plate 40 has an arm 127 which extends over the magazine 12 to sense a carrier 11 within the magazine 12 adjacent to the plate 40. In the absence of a carrier 11 within the magazine 12 adjacent to the plate 40, the switch 126 is closed to complete a circuit through a solenoid winding 128 to operate a valve 129 connected to the air cylinder 46. Operation of the air cylinder 46 advances the spring-loaded piston rod 47 to advance another magazine on the bar 26 until the switch 126 is opened by a carrier 11 in a succeeding magazine striking the arm 127 to thereby retract the piston rod 47.

A switch 130 mounted on the plate 40 has an arm 131 which extends into the corner 54 of the passageway 53 for sensing a carrier 11 within the corner 54. In the absence of a carrier 11 within the corner 54, the switch 130 is closed to complete a circuit through a solenoid 132 to operate a valve 133 connected to the air cylinder 52. Operation of the air cylinder 52 moves the spring-loaded piston rod 51 to advance a carrier 11 from the magazine 12 into the corner 54 of the passageway 53 to open the switch 130. Opening the switch 130 deactivates the valve 133 to allow retraction of the piston 51.

It is to be understood that the above-described embodiment is illustrative of the principles of the invention and that many other embodiments could be devised without departing from the scope of this invention.

What is claimed is:

1. An apparatus for transferring an unprocessed article from a supply station to a work station and a processed article from the work station to a subsequent station, wherein the article has a peripheral groove, comprising:
   a transfer arm having a transverse slot therethrough with fingers extending into the transverse slot for mating with the peripheral groove of the articles such that the articles may move through the slot;
   means for moving the arm alternately from a transfer position to the work station;
   a first passageway leading from the supply station to a first end of the slot when the arm is at the transfer position;
   a second passageway leading from the second end of the slot to the subsequent station when the arm is at the transfer position; and
   means for advancing an unprocessed article from the supply station through the first passageway into the slot whereby a processed article is moved from the slot through the second passageway to the subsequent station.

2. An apparatus for transferring an article from a supply station to a work station, comprising:
   a slidable block;
   a transfer arm pivotally mounted on the slidable block for receiving the article, said transfer arm having gear teeth formed thereon;
   a slidable rack meshing with the gear teeth on the transfer arm;
   means for moving the article from the supply station to the transfer arm where the article is received by the transfer arm; and
   means for advancing the slidable block whereupon the transfer arm both (1) pivots due to the rolling of the gear teeth on the rack and (2) moves linearly due to the sliding of the rack to transfer the article to the work station.

3. An apparatus for transferring an article from a supply station to a work station as defined in claim 2, which includes:
  means for stopping the pivotal movement of the arm with respect to the block when the arm reaches a predetermined angle thereon; and
  means for biasing the rack to inhibit sliding movement thereof until the arm rotates to the predetermined angle whereupon the rack slides to move the transfer arm linearly.

4. An apparatus as defined in claim 3, wherein:
  said transfer arm has a slot for receiving the article; and which includes:
  a conveyor at the work station which has a recess for receiving the article which is inserted therein by the linear movement of the arm; and
  means for moving the conveyor to remove the article from the slot.

5. An apparatus as defined in claim 4 in which the articles have a peripheral groove, and the transfer arm has fingers extending into the slot for mating with the peripheral groove of the articles whereby only transverse movement of the articles is permitted through the slot.

6. An apparatus for transferring an unprocessed article from a supply station to a work station and a processed article from the work station to a subsequent station, comprising:
  a transfer arm having means for receiving an article therein;
  a slidable block upon which the transfer arm is pivotally mounted, said transfer arm having at least a section of a pinion formed thereon;
  means for stopping the pivotal movement of the arm with respect to the block when the arm reaches a predetermined angle;
  a slidable track meshing with the pinion section;
  means for biasing the rack to prevent sliding movement thereof until the pivotal movement of the arm reaches the predetermined angle;
  means for alternately advancing and retracting the slidable block to alternately move the arm from a transfer station to the work station;
  a first passageway leading from the supply station to the transfer arm when the arm is at the transfer station;
  a second passageway leading from the transfer arm to the subsequent station when the arm is at the transfer station;
  means actuated while the arm is at the transfer station for advancing an unprocessed article from the supply station through the first passageway to the transfer arm and a processed article from the transfer arm through the second passageway to the subsequent station;
  a conveyor having a first recess for receiving an unprocessed article which is inserted by the movement of the arm from the transfer station and a second recess from which a processed article is transferred to the subsequent station; and
  means actuated when the unprocessed article is inserted into the first recess by the movement of the arm for advancing the conveyor whereupon the unprocessed article is removed from the arm and a processed article within the second recess of the conveyor is received by the transfer arm.

7. An apparatus as defined in claim 6, wherein:
  said transfer arm has a slot for receiving the article;
  said first passageway leads from the supply station to a first end of the slot;
  said second passageway leads from a second end of said slot to the subsequent station;
  said conveyor advancing means removes the unprocessed article from the slot and moves a processed article within the second recess into the slot; and
  said article advancing means advances an unprocessed article from the supply station through the first passageway into the slot and a processed article from the slot through the second passageway to the subsequent station.

8. An apparatus as defined in claim 7, in which the articles have a peripheral groove, and the transfer arm has fingers extending into the transverse slot for mating with the peripheral groove of the articles whereby only transverse movement of the articles is permitted through said slot.

9. An apparatus for transferring articles both to and from a work station comprising:
  a plurality of magazines movable along a path first to an unloading station and then to a loading station;
  a transfer arm movable to first and second positions and having means for receiving an article;
  a first passageway leading from a magazine at the unloading station to the article receiving means when the arm is in its first position;
  a second passageway leading from the article receiving means to a magazine at the loading station when the arm is in its first position;
  means actuated when the arm is in its first position (a) for feeding an article from a magazine at the unloading station through the first passageway to article receiving means and (b) for feeding an article from the article receiving means through the second passageway to a magazine at the loading station;
  means for alternately moving the arm between its first and second positions to alternately transfer articles to and from the work station; and
  means actuated when the articles are transferred from the magazine at the unloading station for advancing the plurality of magazines along the path.

10. An apparatus as defined in claim 9, wherein:
  the article receiving means of the transfer arm includes a slot;
  the first passageway leads from a magazine at the unloading station to a first end of the slot;
  the second passageway leads from the second end of the slot to a magazine at the loading station; and
  the article feeding means advances an article through the first passageway into the slot thus pushing an article from the slot into the second passageway.

References Cited

UNITED STATES PATENTS

| | | |
|---|---|---|
| 2,277,710 | 3/1942 | Mertzanoff et al. |
| 3,151,753 | 10/1964 | Verrinder et al. _____214—6 |
| 3,340,176 | 9/1967 | Belluso et al. _____ 214—17 |
| 1,164,277 | 12/1915 | Forsstrom. |
| 2,696,921 | 12/1954 | Desjardins _____ 214—16.1 |

FOREIGN PATENTS 951,740   3/1964   Great Britain.

GERALD M. FORLENZA, Primary Examiner

FRANK E. WERNER, Assistant Examiner

U.S. Cl. X.R.

214—91